US009561697B2

(12) United States Patent
Schramm et al.

(10) Patent No.: US 9,561,697 B2
(45) Date of Patent: Feb. 7, 2017

(54) SINGLE POINT DISCONNECT IN AN AIRCRAFT PUSHBACK OPERATION

(71) Applicant: Delta Air Lines, Inc., Atlanta, GA (US)

(72) Inventors: Curtis Schramm, Palmetto, GA (US);
Brian Ardrey, Temple, GA (US);
Casey Aycock, Newnan, GA (US); Jim Heinzel, Newnan, GA (US)

(73) Assignee: Delta Air Lines, Inc., Atlanta, GA (US)

( * ) Notice: Subject to any disclaimer, the term of this patent is extended or adjusted under 35 U.S.C. 154(b) by 0 days.

(21) Appl. No.: 14/644,529

(22) Filed: Mar. 11, 2015

(65) Prior Publication Data

US 2016/0083113 A1   Mar. 24, 2016

Related U.S. Application Data

(60) Provisional application No. 62/054,642, filed on Sep. 24, 2014.

(51) Int. Cl.
*B60D 1/145* (2006.01)
*B60Q 9/00* (2006.01)
*B64F 1/22* (2006.01)

(52) U.S. Cl.
CPC ............ *B60D 1/145* (2013.01); *B60Q 9/00* (2013.01); *B64F 1/224* (2013.01); *B64F 1/225* (2013.01)

(58) Field of Classification Search
CPC ........... B60D 1/145; B60Q 9/00; B62D 15/02; B64F 1/00; B64F 1/02; B64F 1/10
USPC ........................................ 180/904; 280/504
See application file for complete search history.

(56) References Cited

U.S. PATENT DOCUMENTS

| 4,007,890 | A | * | 2/1977 | Bremer | B60T 8/1703 |
| | | | | | 180/904 |
| 4,113,041 | A | * | 9/1978 | Birkeholm | B60K 31/00 |
| | | | | | 180/14.1 |
| 4,955,777 | A | * | 9/1990 | Ineson | B64F 1/22 |
| | | | | | 180/904 |
| 6,305,484 | B1 | * | 10/2001 | Leblanc | B60T 7/16 |
| | | | | | 180/167 |

\* cited by examiner

*Primary Examiner* — Anne Marie Boehler
*Assistant Examiner* — Felicia L Brittman
(74) *Attorney, Agent, or Firm* — King & Spalding

(57) ABSTRACT

A single point disconnect system useful for pushback of an aircraft using a tow bar and a vehicle includes a first sensor assembly that determines whether an angle of the tow bar respective to a surface of the vehicle to which the tow bar is coupled exceeds a threshold limit, a second sensor assembly that determines the direction of the wheels of the vehicle that are responsible for steering the vehicle, and an indicator panel. The indicator panel includes a first light module and a second light module that are coupled to the first sensor assembly and the second sensor assembly, respectively. The first light module emits light that indicates the angle of the tow bar respective to the surface of the vehicle and the second light module emits light that indicates the direction of the wheels of the vehicle.

31 Claims, 12 Drawing Sheets

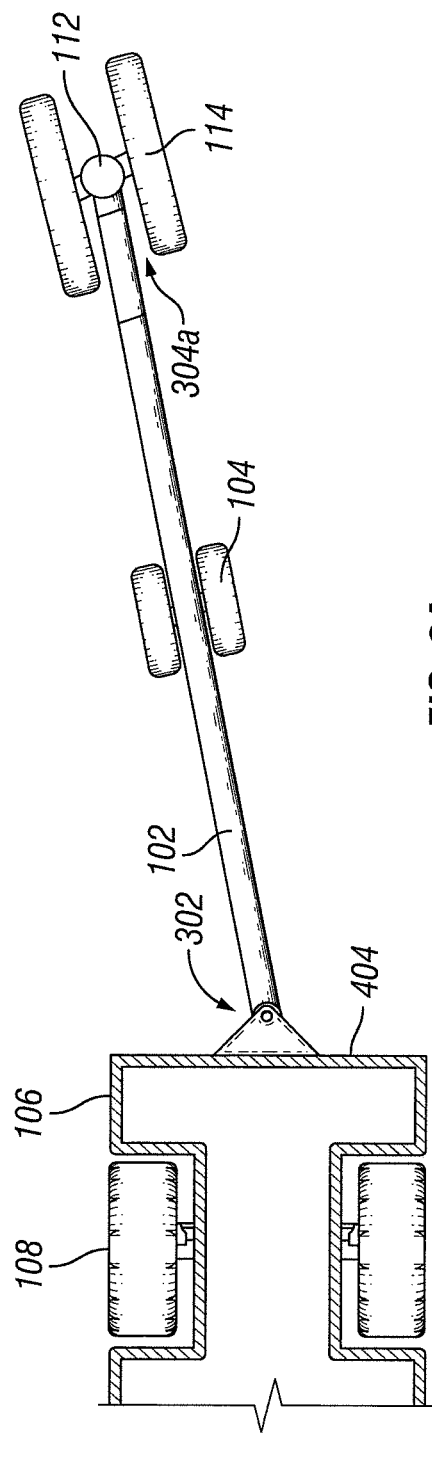
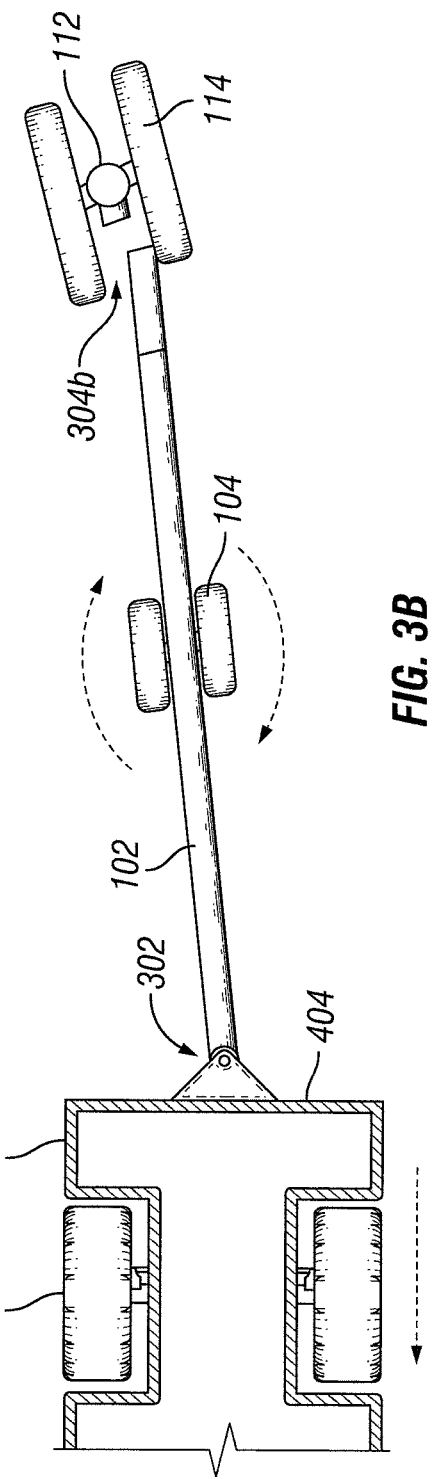

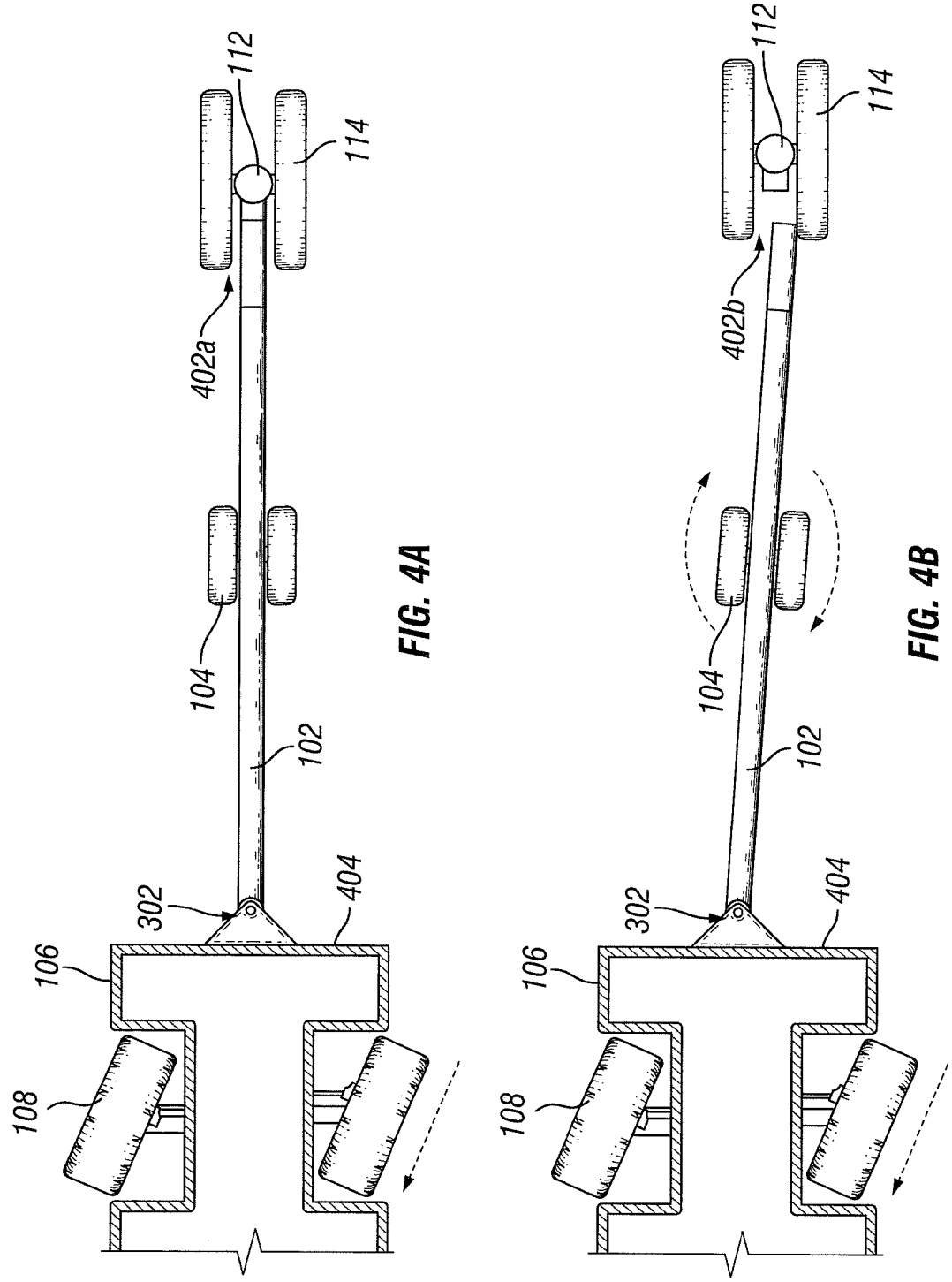

SINGLE POINT DISCONNECT IN AN AIRCRAFT PUSHBACK OPERATION

CROSS-REFERENCE TO RELATED APPLICATIONS

This application claims priority to U.S. Provisional Patent Application No. 62/054,642 filed on Sep. 24, 2014 and entitled "Single Point Disconnect for Disconnecting a Tow Bar from an Aircraft," the entire contents of which are hereby incorporated herein by reference.

FIELD OF THE INVENTION

Embodiments of this disclosure relate generally to towing systems, and more particularly to a single point disconnect for disconnecting a tow bar from an aircraft in a single point disconnect method associated with a pushback operation.

BACKGROUND

Although aircrafts can use reverse thrust to push themselves backwards on the ground, the jet blast or the prop wash resulting from the reverse thrust can cause damage to an airport terminal building or equipment. Also, aircraft engines close to the ground may blow sand and debris forward and then suck it back into the aircraft engine, causing damage to the aircraft engine. Therefore, using external power to push the aircraft backwards is often preferred over using the reverse thrust of the aircraft. This procedure of pushing an aircraft backwards using external power is referred to as 'pushback'.

Typically, pushback operations use a vehicle, such as a pushback tractor, in conjunction with a tow bar as illustrated in the example embodiment of FIG. 1. In particular, as illustrated in FIG. 1, one end of the tow bar 102 may be coupled to a nose landing gear 112 of the aircraft 110 while the other end of the tow bar 102 may be coupled to the vehicle 106. Once the tow bar 102 is coupled to both the aircraft 110 and the vehicle 106, a driver may operate/steer the vehicle 106 to push the aircraft back by leveraging the tow bar 102. Once the pushback operation is completed, the tow bar 102 is disconnected and the vehicle 102 is driven away from the aircraft 110 to clear the aircraft 110 for taxiing.

Conventional technology includes disconnecting the tow bar using a three point disconnect operation as illustrated in FIG. 1. In particular, as illustrated in FIG. 1, the three point disconnect operation includes three steps for disconnecting the tow bar after pushback. First, the tow bar 102 is disconnected from the vehicle 106 and the vehicle 106 is driven to a short distance away from the aircraft 110 (Step 150). Then, the tow bar 102 is disconnected from the nose landing gear 112 of the aircraft 110 (Step 160). At this point, the tow bar 102 remains disconnected from both the vehicle 106 and the aircraft 110, and the tow bar 102 is manually pulled on its carry wheels 104 towards the vehicle 106 (Step 170). Finally, the tow bar 102 is connected back to the vehicle 106, and the vehicle 106 is driven away with the tow bar 102 to ready the aircraft 110 for taxiing. The conventional three point disconnect operation is time intensive as it requires carefully disconnecting the tow bar 102 on each end and then reconnecting one end back to the vehicle 106. The time intensive nature of the three point disconnect operation may cause aircraft departure delay. Further, since the aircraft engine is operational during the pushback as well as tow bar 102 disconnect operation, a longer disconnect time will result in unproductive and undesirable consumption of aircraft fuel which is very expensive.

An alternative to the three-point disconnect operation may include a single point disconnect operation which includes only one step where the tow bar 102 is disconnected from the nose landing gear 112 while the tow bar 102 remains coupled to the vehicle 106, as illustrated in FIG. 2. That is, in this prior single point disconnect operation, once the aircraft 110 is pushed back, the tow bar 102 is not disconnected from the vehicle 106 as in the case of the three-point mechanism. Instead, in the prior single point disconnect operation, the tow bar 102 is only disconnected from the nose landing gear 112 of the aircraft 110 while the other end of the tow bar 102 remains coupled to the vehicle 106 (Step 260). The single point disconnect operation saves significant time over the three point disconnect operation, since the single point disconnect operation includes only one step, i.e., disconnect the tow bar 102 from the nose landing gear 112. For example, the single point disconnect operation saves approximately two and a half minutes per push on average and allows the aircraft to depart quicker after the pushback operation, which in turn leads to substantial fuel savings, cost savings, and quicker departure.

While single point disconnect operation may be more efficient compared to three point disconnect operation, improper disconnection of the tow bar 102 using the prior single point disconnect operation may result in significant injury to the ground crew and/or damage to the aircraft, e.g., damage to the aircraft nose landing gear as illustrated in FIGS. 3 and 4.

In one example, as illustrated in FIG. 3A, after the pushback operation, the angle of the tow bar 102 respective to the surface 404 of the vehicle 106 may exceed a threshold limit. The term 'surface of the vehicle,' as used herein generally refers to a surface (of the vehicle) to which the tow bar is coupled. For example, if the tow bar is coupled to a back side of the vehicle, the surface of the vehicle may refer to a rear surface. The term 'angle of the tow bar respective to the surface of the vehicle,' as used herein may refer to a horizontal angle formed by a longitudinal axis of the tow bar 102, i.e., the axis along the length of the tow bar, with respect to a plane passing through a longitudinal axis and a vertical axis of the vehicle, provided the tow bar 102 is coupled to either the front side or rear side of the vehicle. Herein, the plane passing through the longitudinal axis and the vertical axis of the vehicle 106 may be referred to as 'longitudinal plane of the vehicle'. Further, the term 'longitudinal axis of the vehicle,' as used herein may generally refer to an axis that is parallel to the ground, extends along the length of the vehicle (e.g., a pushback tractor/tug), and symmetrically divides the vehicle into a right half and left half. The lateral axis of the vehicle is orthogonal to the longitudinal axis and is also parallel to the ground. The term 'vertical axis of the vehicle,' as used herein generally refers to an axis of the vehicle that is orthogonal to both the longitudinal and lateral axis of the vehicle 106. Further, the term 'horizontal angle,' and used herein may generally refer to an angle between two lines on a substantially horizontal plane or a plane passing through the longitudinal axis and the lateral axis of the vehicle and substantially parallel to the ground. The longitudinal axis 340 of the vehicle 106, the lateral axis 350 of the vehicle 106, the vertical axis 360 of the vehicle 106, and the longitudinal axis of the tow bar 102 are illustrated for reference in FIG. 3C. The term 'longitudinal axis of the tow bar,' generally refers to an axis through the length of the tow bar.

When the angle formed by a longitudinal axis of the tow bar 102 with respect to a plane passing through a longitudinal plane of the vehicle exceeds a threshold limit, the tow bar 102 may pivot on the carry wheels 104 and strike the aircraft wheel 114 responsive to disconnecting the tow bar 102 from the nose landing gear 112 of the aircraft 110, as illustrated by reference numerals 304a and 304b in FIG. 3B. That is, too much departure angle between the tow bar 102 and the surface 404 of the vehicle 106 may cause the tow bar head to come in contact with the nose landing gear 112 and/or the nose landing wheel 114 of the aircraft 110 and result in significant damage.

In another example illustrated in FIG. 4A, after a pushback operation, the wheels 108 associated with steering of the vehicle 106 (herein 'steering wheels 108') may not be straight, i.e., the direction of the wheels 108 may not be substantially parallel to the longitudinal axis of the vehicle 106. Similar to an improper alignment of the tow bar 102, if the steering wheels 108 of the vehicle 106 are not straight, the tow bar 102 may pivot on the carry wheels 104 and the head of the tow bar 102 striking the nose landing gear 112 and/or the nose landing wheel 114 of the aircraft responsive to disconnecting the tow bar 102 from the nose landing gear 112 of the aircraft 110 and moving the vehicle 106 away from the aircraft 110. Damage to the nose landing gear 112 and/or nose landing wheel 114 can result in a cancelled flight which may be costly both financially and in regards with passenger experience. Therefore, there is a need for a technology that provides a safe and efficient solution for single point disconnect of a tow bar and subsequent departure.

SUMMARY

The present disclosure addresses the above-mentioned shortcomings by providing a safe and efficient solution for a single point disconnect of a tow bar from an aircraft. In particular, the technical solution described herein provide a mechanism to ensure that: (1) the angle of the tow bar 102 with respect to the surface 404 of the vehicle 104 is within a threshold limit, and (2) the steering wheels of the vehicle are straight, which in turn prevents damage to the nose landing gear and/or the nose landing gear wheel of the aircraft resulting from a contact with the tow bar head responsive to disconnecting the tow bar from the aircraft in a single point disconnect operation. The term 'steering wheels of the vehicle are straight,' as used herein generally refers to the steering wheels being substantially parallel to a longitudinal axis of the vehicle. Further, even though FIGS. 1, 2, 3, 4, 6, and 8 illustrate the front wheels of the vehicle as being the 'steering wheels 108' of the vehicle, one of ordinary skill in the art can understand and appreciate that in some embodiments, the steering wheels 108 can include the rear wheels of the vehicle without departing from a broader scope of this disclosure.

In an example aspect, a system for disconnecting a tow bar from the aircraft in a single point disconnect operation includes a first sensor assembly, a second sensor assembly, and an indicator panel that operate in concert to ensure that the tow bar departs from the aircraft's nose landing gear without damaging the nose landing gear and/or nose landing gear wheel of the aircraft. In particular, the first sensor assembly is coupled to a first light module of the indicator panel and the second sensor assembly is coupled to a second light module of the indicator panel. Each of the first light module and the second light module emit either light having a first color or light having a second color to indicate a status of the angle of the tow bar to the surface of the vehicle and a direction of the wheels of the vehicle that are responsible for steering the vehicle, respectively. The term 'surface of the vehicle,' as used herein may refer to the surface to which the tow bar is coupled.

On the basis of the color of the light emitted by the first light module and the second light module, a driver of the vehicle determines if it is safe to proceed with the single point disconnect operation and subsequently pull the vehicle away from the aircraft without causing the tow bar to contact and damage the nose landing gear and/or the nose landing gear wheel. Accordingly, for the convenience of the driver, the indicator panel that includes both the first light module and the second light module is located inside the vehicle such that it is in a line of sight and within a visible range of the driver while the driver is in the vehicle, e.g., driver's compartment or driver's cabin in the vehicle. Therefore, even though the driver, from the driver's compartment, cannot always see the angle of the tow bar relative to the vehicle, or the direction of the steering wheels of the vehicle, the driver can determine the tow bar angle and the direction of the steering wheels with the assistance of the indicator panel.

For example, when an angle of the tow bar with respect to the surface of the vehicle and the direction of the steering wheels of the vehicle are acceptable for a single point disconnect operation, the first light module and the second light module emit light having a first color. Similarly, when the angle of the tow bar with respect to the surface of the vehicle and the direction of the steering wheels of the vehicle are unacceptable for proceeding with a single point disconnect operation, the first light module and the second light module emits light having a second color. In one example, the first color and the second color may green and red, respectively. Accordingly, a green light from the first light module and the second light module informs the driver that the single point disconnect operation can be initiated and that the vehicle can be pulled away from the aircraft responsive to disconnecting the tow bar from the aircraft without damaging the nose landing gear and/or the nose landing gear wheels. Similarly, a red light from the first light module and/or the second light module informs the driver that a respective tow bar angle correction and/or steering correction needs to be made prior to initiating the single point disconnect operation and a subsequent vehicle departure. Alternatively, the driver can abort the single point disconnect operation when the red light is emitted from the first light module and/or the second light module.

One of ordinary skill in the art can understand and appreciate that the green light and red light are examples and are not limiting. That is, the first light module and the second light module may be configured to emit light having any appropriate color. Further, one of ordinary skill in the art can understand and appreciate that the first light module can emit light having a first color and/or a second color while and the second light module can emit light having a third color and/or a fourth color. For example, the first light module may emit yellow light or blue light to indicate a status of the angle of the tow bar to the surface of the vehicle while the second light module may emit green light and red light to indicate the direction of the wheels of the vehicle.

In one example, each of the first light module and the second light module include at least two light sources. That is the first light module includes a first light source that emits light having the first color and a second light source that emits light having the second color. Similarly, the second light module includes a third light source that emits light having the first color and a fourth light source that emits light having the second color. The light sources in each of the first light module and the second light module can include any appropriate artificial light source, such as lighting emitting diode (LED), fluorescent lamp, etc. Even though two different light sources are used to emit light having two different colors, e.g., green LED for green light and red LED for red light, one of ordinary skill in the art can understand and appreciate that a single light source that is capable of emitting light having different colors, e.g., a bi-color LED or multi-color LED, is not outside the scope of this disclosure. Alternatively, an array of LEDs can be operated in combination to generate light having a specific color.

In one example, the first sensor assembly that is coupled to the first light module includes a first sensor and a reflective member. In said example, the first sensor may be coupled to the vehicle and the reflective member may be coupled to the tow bar. The first sensor and the reflective member operate in concert to determine an angle of the tow bar with respect to the surface of the vehicle to which the tow bar is coupled. Responsive to determining the angle of the tow bar with respect to the surface of the vehicle, the first sensor assembly triggers the first light module to emit either light having the first color or light having the second color. In particular, when the angle of the tow bar with respect to the surface of the vehicle is within a threshold limit, the first sensor triggers the first light source of the first light module to emit light having the first color. Similarly, when the angle of the tow bar with respect to the surface of the vehicle exceeds a threshold limit, the first sensor triggers the second light source of the first light module to emit light having the second color.

Further, in one example, the second sensor assembly that is coupled to the second light module includes a second sensor and a target member. The second sensor may be coupled to the vehicle and positioned underneath the vehicle near a tie rod of the vehicle, and the target member may be coupled to the tie rod of the vehicle. The second sensor and the target member operate in concert to determine a direction of the steering wheels of the vehicle. Responsive to determining direction of the steering wheels of the vehicle, the second sensor assembly triggers the second light module to emit either light having the first color or light having the second color. In particular, when the direction of the wheels are substantially parallel to the longitudinal axis 340 of the vehicle 106, the second sensor triggers the third light source of the second light module to emit light having the first color. Similarly, when the direction of the wheels are not substantially parallel to the longitudinal axis 340 of the vehicle 106, the second sensor triggers the fourth light source of the second light module to emit light having the second color.

In addition to the first sensor assembly, the second sensor assembly, and the indicator panel, the example system for disconnecting a tow bar from the aircraft in a single point disconnect operation includes a roller assembly that is coupled to the tow bar head when the tow bar is a yoke style tow bar. In particular, the roller assembly is coupled to the tow bar head of the yoke style tow bar such that the roller assembly is positioned at a distance above the nose landing gear wheel when the tow bar is engaged with the aircraft. Further, when the tow bar is disconnected from the aircraft, the roller assembly drops down on the tires of the nose landing gear wheel to hold the tow bar head away from a spray deflector that surrounds at least three sides of the nose landing gear wheel. Then, as the tow bar is pulled away from the aircraft, the roller assembly rolls along the curve of the tires until the tow bar head is at a certain distance away from aircraft where the tow bar head can drop without contacting and damaging the spray deflector.

These and other aspects, features, and embodiments of the present invention may be more clearly understood and appreciated from a review of the following detailed description of the disclosed embodiments and by reference to the drawings and claims.

BRIEF DESCRIPTION OF THE FIGURES

Example embodiments are illustrated by way of example and not limitation in the figures of the accompanying drawings, in which:

FIGS. 3A and 3B (collectively 'FIG. 3') illustrate a potential tractor surface and tow bar misalignment hazard associated with the single point disconnect operation.

FIGS. 4A and 4B (collectively 'FIG. 4') illustrate a potential tractor wheel and tow bar misalignment hazard associated with the single point disconnect operation.

Figure 1:
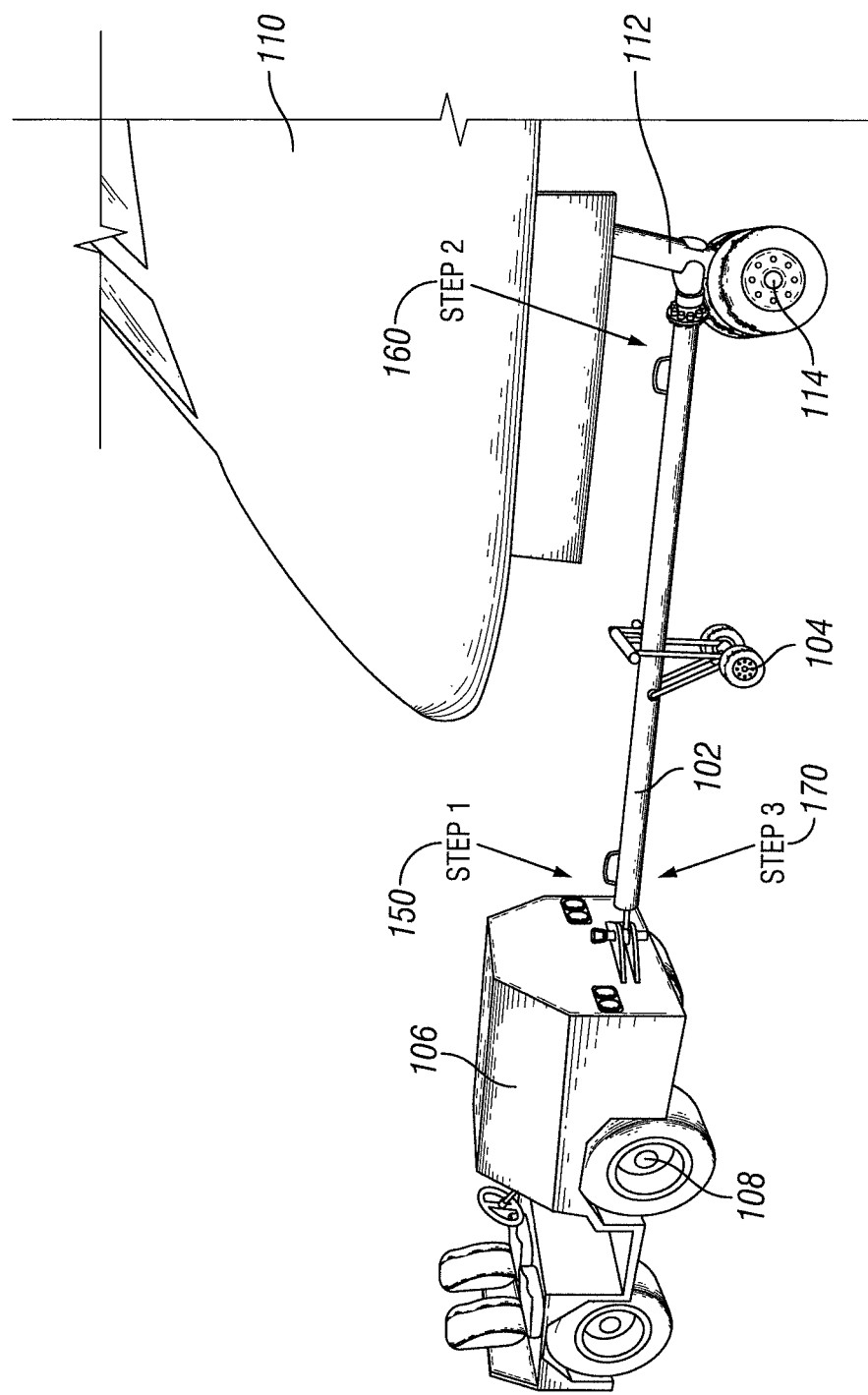
FIG. 1 illustrates a conventional three point disconnect mechanism associated with an aircraft pushback operation.
Figure 2:
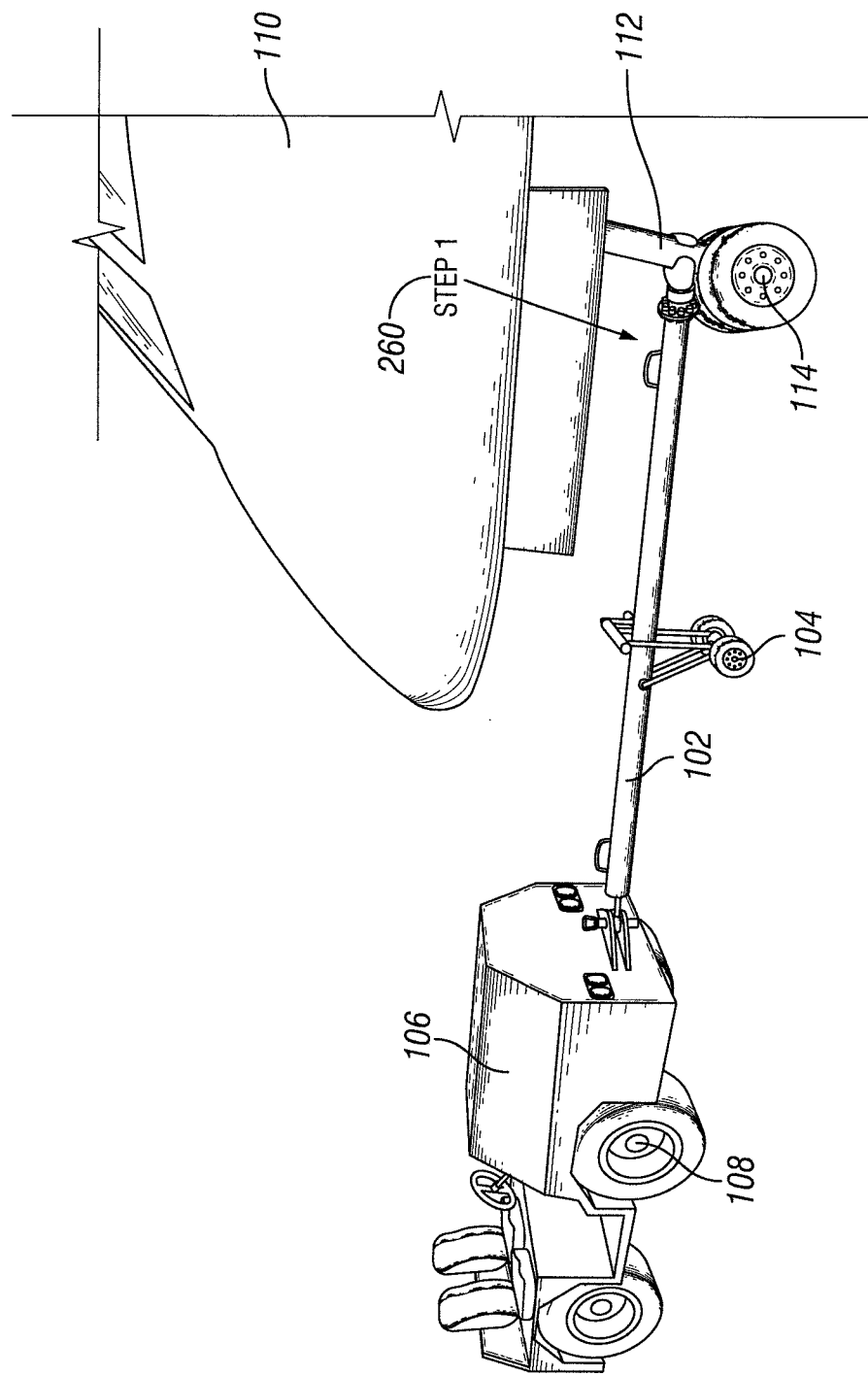
FIG. 2 illustrates a conventional single point disconnect operation associated with an aircraft pushback operation.
Figure 3C:
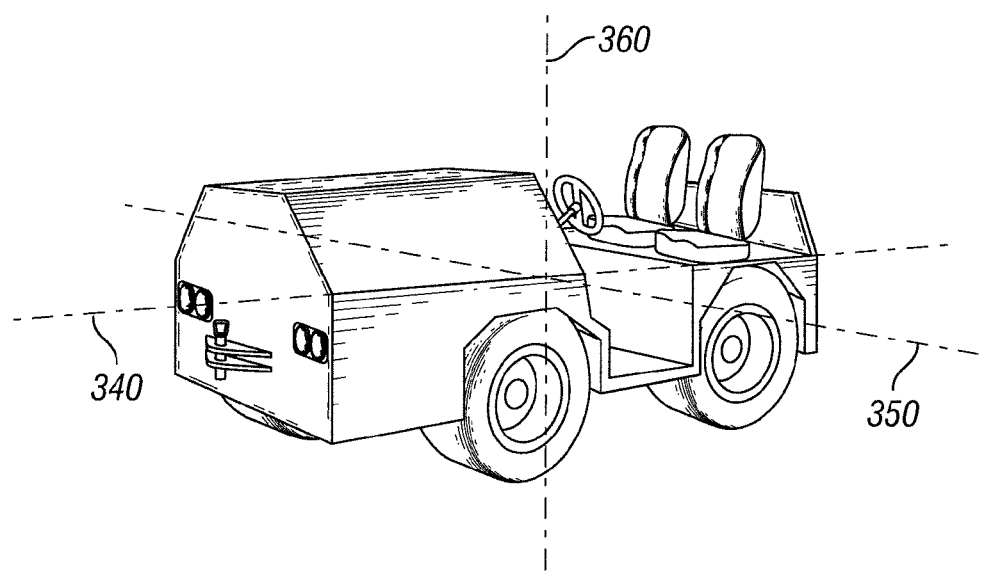
FIG. 3C illustrates axes of the conventional vehicle operation.

Many aspects of the disclosure can be better understood with reference to the above drawings. The elements and features in the drawings are not necessarily to scale; emphasis is instead being placed upon clearly illustrating the principles of example embodiments of the present disclosure. Moreover, certain dimensions may be exaggerated to help visually convey such principles. In the drawings, reference numerals designate like or corresponding, but not necessarily identical, elements throughout the several views.

DETAILED DESCRIPTION OF EXAMPLE EMBODIMENTS

Disclosed are a system, apparatus, and method for disconnecting a tow bar from an aircraft in a single point disconnect operation following a pushback operation.

Technology associated with the system, apparatus, and method for disconnecting a tow bar from an aircraft in a single point disconnect operation will be described in greater detail with reference to FIGS. 5-9 and 11, which describe representative embodiments of single point disconnect system. It will be appreciated that the various embodiments discussed herein need not necessarily belong to the same group of example embodiments, and may be grouped into various other embodiments not explicitly disclosed herein. In the following description, for purposes of explanation, numerous specific details are set forth in order to provide a thorough understanding of the various embodiments.

Figure 5B:
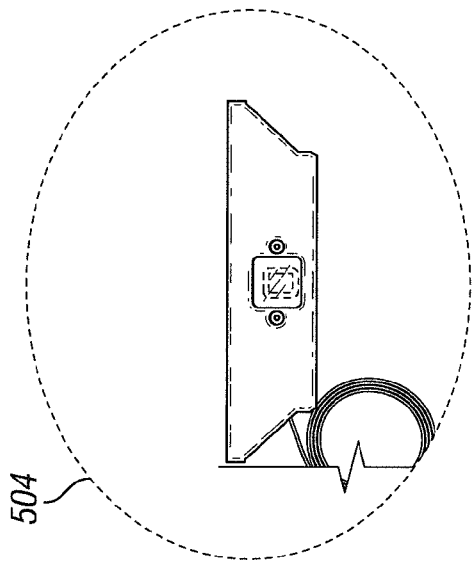
FIGS. 5A, 5B, and 5C (collectively 'FIG. 5') illustrate a first sensor assembly of the single point disconnect system in accordance with an example embodiment.
Figure 5A:
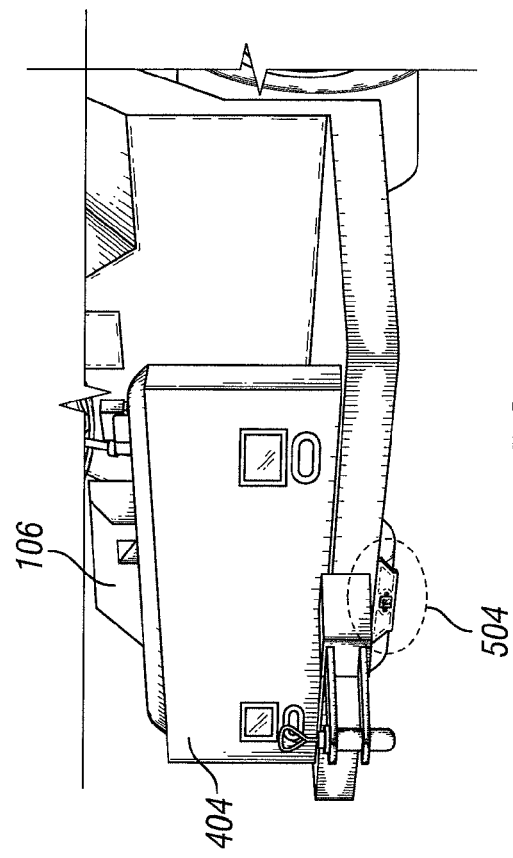

Turning to FIG. 5, this figure illustrates a first sensor assembly of the single point disconnect system in accordance with an example embodiment. FIG. 5 may be described by making exemplary reference to FIGS. 6 and 9 as may be appropriate or helpful. In particular, FIG. 5 illustrates a first sensor 504 and a reflective member 506 that forms the example first sensor assembly.

The first sensor 504 may be attached to the vehicle under the front surface 404 of the vehicle 106, and the reflective member 506 may be attached underside the tow bar 102 near a vehicle connection end of the tow bar 102 such that the first sensor 504 and the reflective member 506 face each other. Even though FIG. 5 illustrates a specific arrangement and location of the first sensor and the reflective member, one of ordinary skill in the art can understand and appreciate that the first sensor 504 and the corresponding reflective member 506 can be located at any appropriate location on any other surface of the vehicle 106 and/or tow bar 102, respectively, without departing from a broader scope of this disclosure, provided that the resulting first sensor assembly can determine the angle of the tow bar with respect to the surface of the vehicle with precision. For example, the first sensor 504 can be attached on the front surface 404 of the vehicle 106 above the tow hitch 502 and the corresponding reflective member 506 of the first sensor assembly can be attached on an upper side of the tow bar 102.

In one example embodiment, the first sensor may be a photoelectric sensor. The photoelectric sensor 504 may include a light transmitter, often infrared, and a photoelectric receiver. Further, the photoelectric sensor 504 may include one or more output ports/terminals (not shown in Figure). The output ports/terminals of the photoelectric sensor 504 may be coupled to the first light module 604 of the indicator panel 602 (shown in FIGS. 6 and 9). In particular, one output port/terminal of the photoelectric sensor 504 may be connected to a first light source 604a of the first light module 604 and the other output port/terminal of the photoelectric sensor 504 may be connected to a second light source 604b of the first light module 604 (shown in FIG. 6). On the basis of the angle of the tow bar 102 with respect to the surface 404 of the vehicle 106, the photoelectric sensor 504 may generate an output signal at a corresponding output port of the photoelectric sensor 504. Further, the output signal is transmitted to the first light module 604 to trigger the first light source 604a or the second light source 604b for emitting light that indicates whether the angle of the tow bar 102 with respect to the surface 404 of the vehicle 106 exceeds the threshold limit or is within the threshold limit.

Figure 5C:
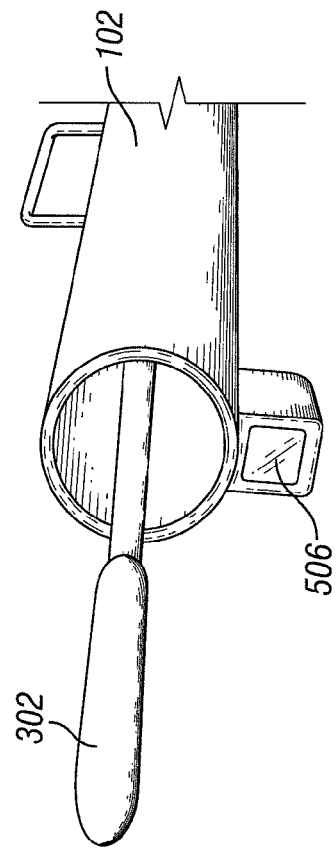

In one example embodiment, the reflective member 506 of the first sensor assembly may be a surface coated with retro-reflective material (paint, sticker, etc.). For example, as illustrated in FIG. 5C, the skid foot/skeg of the tow bar 102 may be coated with or attached with a retro-reflective material. In one example embodiment, the skid foot/skeg of the tow bar 102 may be integral to the tow bar 102, whereas, in another example embodiment, the skid foot/skeg or any other surface used as reflective member 506 may be separable from the tow bar 102 and may be attached to tow bar 102 using suitable means, such as fasteners, U-bolts, etc.

In one example embodiment, the photoelectric sensor 504 may be powered by a direct current source, such as a 12V battery of the vehicle 106, whereas, in another example embodiment, the photoelectric sensor 504 may be powered by an alternate power source, such as battery, etc. One of ordinary skill in the art can understand and appreciate that the photoelectric sensor and reflector assembly is an example first sensor assembly, and is not limiting. In other words, the first sensor assembly can be replaced with any other appropriate mechanism to detect a position or angle of the tow bar 102 with respect to the surface 404 of the vehicle 106 without departing from a broader scope of this disclosure.

For example, the first sensor assembly may include one or more fiber glass poles mounted on either side of the front surface 404 of the vehicle 102. The one or more fiber glass poles may point inward towards the tow bar 102 leaving enough gap in between to allow an X degree movement of the tow bar 102 towards each side of the vehicle 106. In said example first sensor assembly, when the tow bar is at an angle greater than X degree to either side, the tow bar 102 comes in contact with the fiber glass poles which triggers an indication that the tow bar 102 is at an unacceptable angle for single point disconnect operation and subsequent departure.

In another example, the first sensor assembly may include a backup type camera (also known as reversing cameras or rear-view cameras) mounted on the surface of the vehicle to which the tow bar is coupled. That is, if the tow bar is coupled to the front surface, the backup type camera may be mounted on the front surface of the vehicle. Alternately, if the tow bar is coupled to the back surface of the vehicle, the backup type camera is mounted on the back surface of the vehicle. In addition to the backup camera, the example first sensor assembly may include a display screen mounted in the driver's/operator's cabin. Further, the display may be programmed with guide lines or range limit lines that would indicate to the operator whether the tow bar is within safe limits for a single point disconnect and departure operation.

In yet another example, the first sensor assembly may include a magnetic Hall Effect switch installed in the tow hitch 502 and a corresponding magnet mounted on the eye of the tow hitch 502. In the example Hall Effect first sensor assembly, the magnet triggers the Hall Effect switch when the magnet is in close proximity to the Hall Effect switch, indicating that the tow bar is straight in front of the vehicle.

In another example, the first sensor assembly may include a low power laser pointer mounted on the surface (of the vehicle) to which the tow bar is coupled. The laser pointer may be configured to send laser light towards a landing gear strut of the aircraft 110, which in turn reflects the laser light when the vehicle 106 is lines up straight with the tow bar and the landing gear strut. The reflected laser light provides a visual indication to the operator that the tow bar is aligned at an acceptable angle with respect to the surface of the vehicle for a single point disconnect and departure.

Turning to FIG. 6, this figure illustrates an operation of the first sensor assembly of FIG. 5 for determining an angle of the tow bar respective to the vehicle surface in accordance with an example embodiment. In particular, FIG. 6 illustrates a vehicle 106 (pushback vehicle), a tow bar 102 coupled to the tow hitch of the vehicle 106 on one end and to the nose landing gear 112 of the aircraft on another end, carry wheels 104 of the tow bar 102, a first sensor 504 of the first sensor assembly, a reflective member 506 of the first sensor assembly, wheels of the vehicle 108, a front surface of the vehicle 404, nose landing gear wheels 114 of the aircraft, an indicator panel 602, and a first and second light source (604a, 604b) of the first light module 604.

Figure 6A:
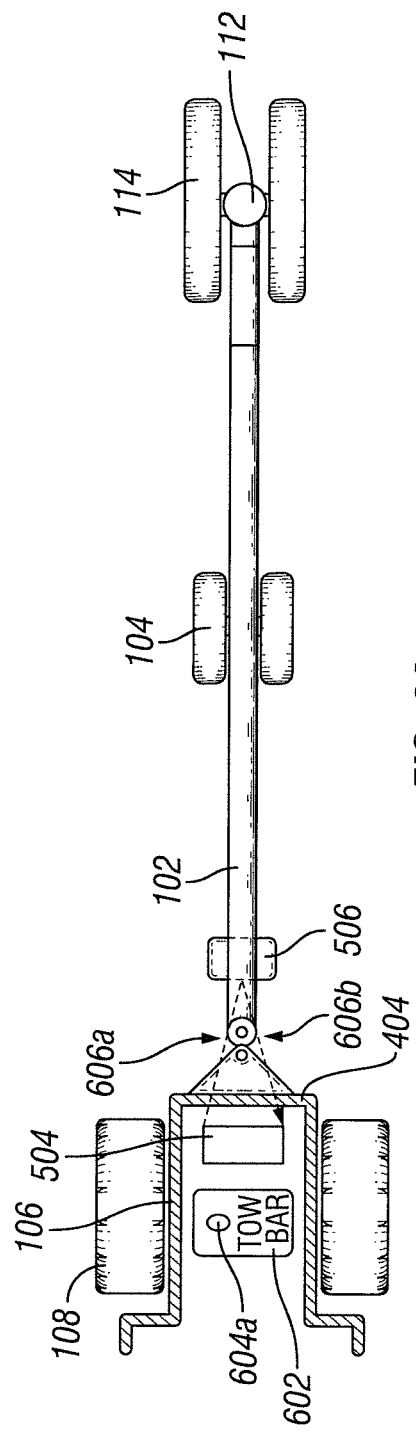
FIGS. 6A and 6B (collectively 'FIG. 6') illustrate operation of the first sensor assembly of FIG. 5 for determining an angle of the tow bar respective to the vehicle surface in accordance with an example embodiment.

In one example embodiment, when the photoelectric sensor 504 is powered on, the light transmitter of the photoelectric sensor 504 may transmit a signal 606a, often an infrared signal, towards the reflective member 506, which in turn reflects the signal 606a back to the photoelectric sensor 504. In one embodiment, as illustrated in FIG. 6A, when the angle of longitudinal axis of the tow bar 102 with respect to the longitudinal plane 340 of the vehicle 106 is within a threshold limit, a photoelectric receiver of the photoelectric sensor 504 may receive the reflected signal 606b. In one example, the threshold limit may be +/−15 degrees. Responsively, the photoelectric sensor 504 may generate a first output signal that is transmitted to the first light source 604a of the first light module 604. Upon receiving the first output signal, the first light source 604a may emit light having a first color which indicates that the angle of the tow bar 102 with respect to the surface 404 of the vehicle 106 is within the threshold limit.

Figure 6B:
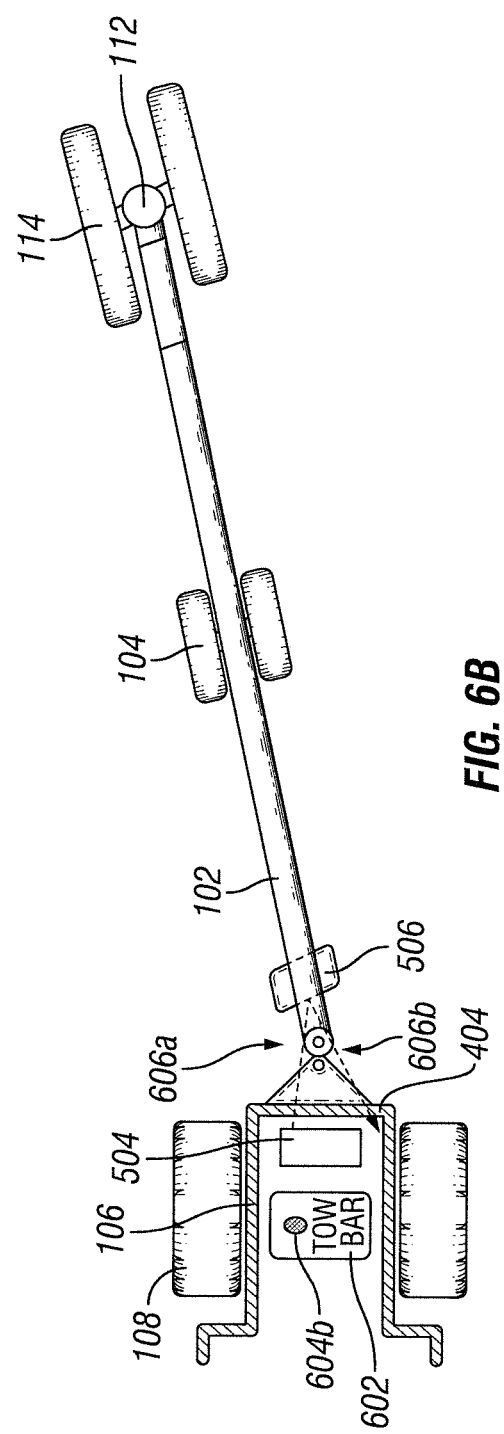

Similarly, as illustrated in FIG. 6B, when the angle of longitudinal axis of the tow bar 102 with respect to the longitudinal plane 340 of the vehicle 106 exceeds the threshold limit, a photoelectric receiver of the photoelectric sensor 504 may receive the reflected signal 606b. Responsively, the photoelectric sensor 504 may generate a second output signal that is transmitted to the second light source 604a of the first light module 604. Upon receiving the second output signal, the second light source 604a may emit light having a second color which indicates that the angle of the tow bar 102 with respect to the surface 404 of the vehicle 106 exceeds the threshold limit.

Accordingly, based on the color of the light emitted by the first light module 604, the driver/operator of the vehicle 106 can determine whether an angle of the tow bar 102 with respect to the surface 404 of the vehicle 106 is within or exceeds the threshold limit for a single point disconnect operation and subsequent departure.

Figure 7:
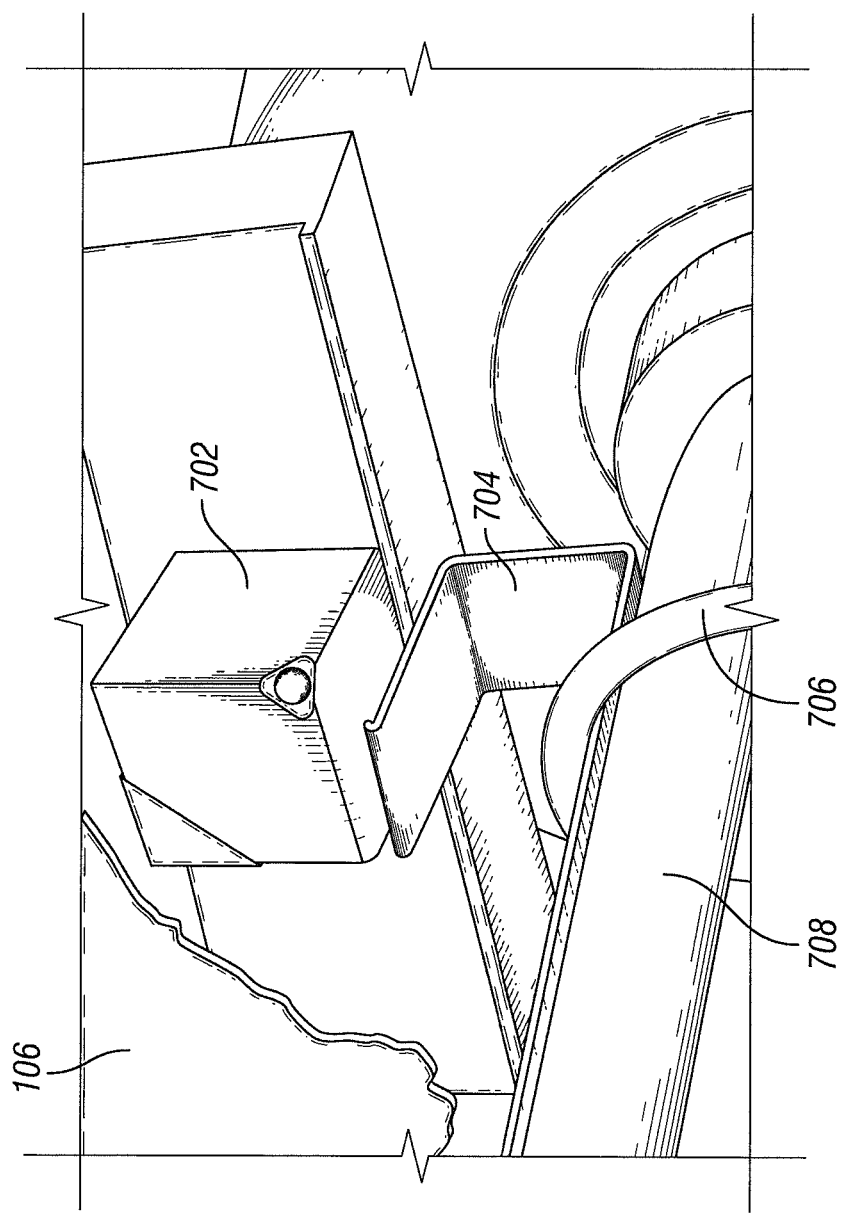
FIG. 7 illustrates a second sensor assembly of the single point disconnect system in accordance with an example embodiment.

Now turning to FIG. 7, this figure illustrates a second sensor assembly in association with the single point disconnect operation in accordance with an example embodiment. FIG. 7 may be described by making exemplary reference to FIGS. 8 and 9 as may be appropriate or helpful. In particular, FIG. 7 illustrates a second sensor 702 and a target member 704 pair of the second sensor assembly to determine a direction of the steering wheels 108 of the vehicle 106. In one example embodiment, the second sensor 702 may be a proximity sensor and the target member 704 may be a ferrous metal device. Although FIG. 7 illustrates a proximity sensor and a ferrous target member pair, one of ordinary skill in the art can understand and appreciate that the second sensor assembly can include any other appropriate sensor, mechanism, or means to determine the direction of the steering wheels 108 of the vehicle 106 without departing from a broader scope of this disclosure.

In the example embodiment illustrated in FIG. 7, the proximity sensor 702 is mounted to a frame of the vehicle 106 close to the steering tie rod 708 (e.g., tie rod 708 coupled to the steering wheels 108) of the vehicle 106. The target member 704 is mounted to steering tie rod 708 such that the proximity sensor 702 and the target member 704 align when the direction of the steering wheels is substantially parallel to the longitudinal axis 340 of the vehicle 106. In one example embodiment, when the front wheels are responsible for steering the vehicle, the steering tie rod 708 may refer to a tie rod coupled to the front wheels of the vehicle. In another example embodiment, when the rear wheels of the vehicle are associated with steering the vehicle, the steering tie rod 708 may refer to a tie rod coupled to the rear wheels of the vehicle. Consequently, the placement of the second sensor assembly (e.g., proximity sensor and target member) may vary based on whether the front wheels or the rear wheels are associated with steering the vehicle. For example, if the rear wheels are responsible for steering the vehicle 106, the second sensor may be placed near the tie rod coupled to the rear wheels of the vehicle 106, and the target member may be coupled to the tie rod coupled to the rear wheels of the vehicle 106. Alternatively, if the front wheels are responsible for steering the vehicle 106, the second sensor may be placed near the tie rod coupled to the front wheels of the vehicle 106, and the target member may be coupled to the tie rod coupled to the front wheels of the vehicle 106.

The proximity sensor 702 may be a magnetic field emitting device that can detect when a ferrous metal object, such as the target member 704 is in close proximity. Responsive to detecting that the target member is in a close proximity, the proximity sensor 702 may generate an output signal that triggers a third light source 802a or a fourth light source 802b of the second light module 802 to emit light that indicates the direction of the steering wheels 108 of the vehicle 106. Accordingly, one or more output ports/terminals of the proximity sensor 702 may be coupled to the second light module 802 of the indicator panel 602 (shown in FIGS. 8 and 9). In one example, one output port of the proximity sensor 702 may be connected to a third light source 802a of the second light module 802 and the other output port of the proximity sensor 702 may be connected to a fourth light source 802b of the second light module 802 (shown in FIG. 6). The operation of the second sensor assembly, i.e., the proximity sensor 702 and the target member 704 may be described below in greater detail in association with FIGS. 8A and 8B.

Turning to FIG. 8, this figure illustrates an operation of the second sensor assembly of FIG. 7 for determining a direction of the steering wheels of the vehicle in accordance with an example embodiment. In particular, FIG. 8 illustrates a vehicle 106 (pushback vehicle), a tow bar 102 coupled to the tow hitch of the vehicle 106 on one end and to the nose landing gear 112 of the aircraft on the other end, carry wheels 104 of the tow bar 102, a second sensor 702 of the second sensor assembly, a target member 704 of the second sensor assembly, wheels of the vehicle 108, a front surface of the vehicle 404, the nose landing gear wheels 114 of the aircraft, an indicator panel 602, and a third and fourth light source (802a, 802b) of the second light module 802.

Figure 8A:
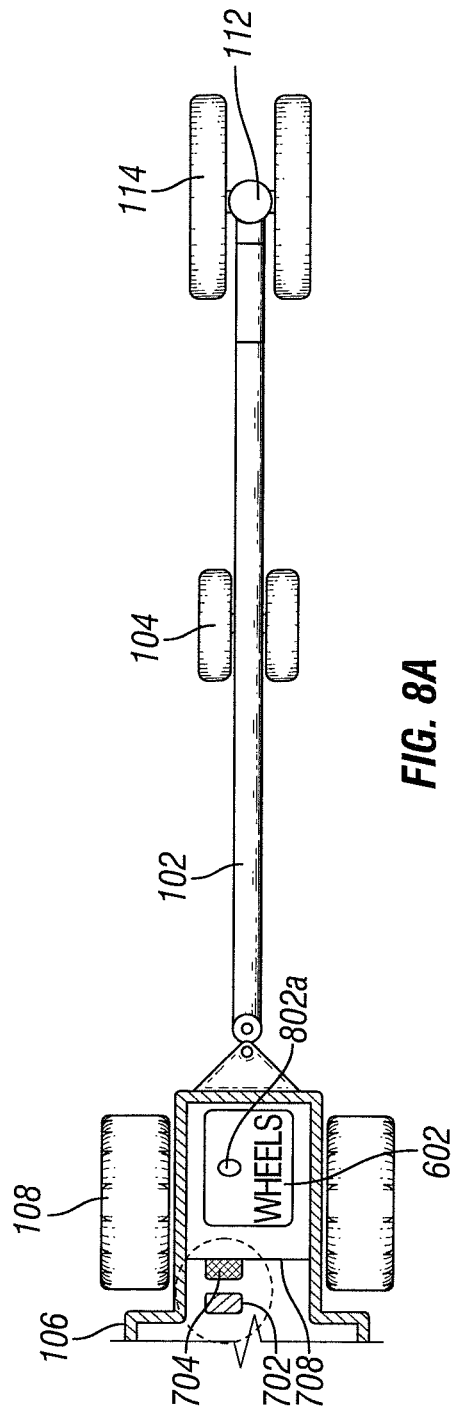
FIGS. 8A and 8B (collectively 'FIG. 8') illustrate operation of the second sensor assembly of FIG. 7 for determining a direction of the steering wheels of the vehicle in accordance with an example embodiment.
Figure 8B:
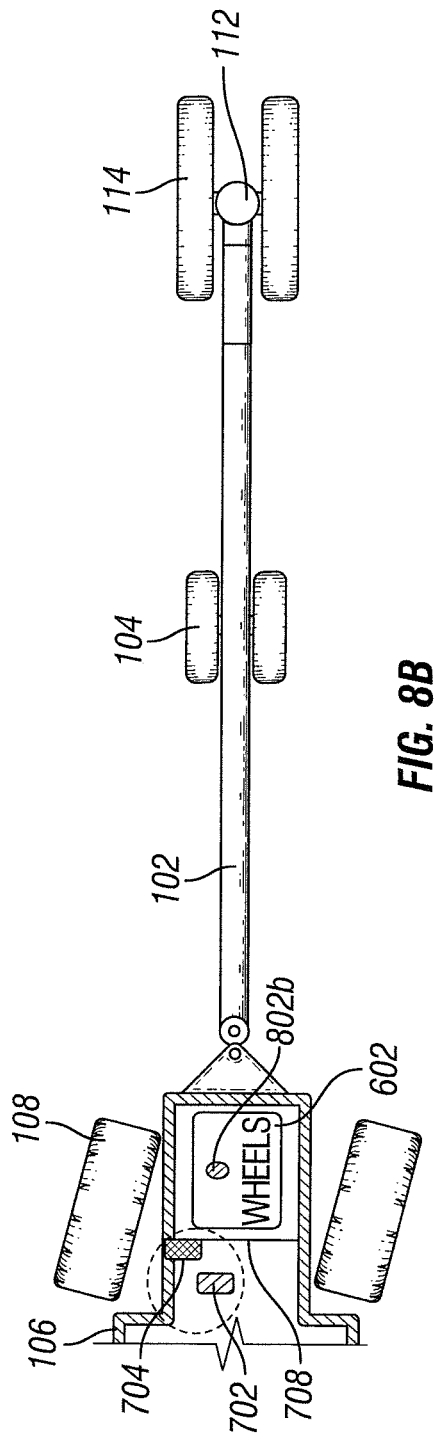

As illustrated in the example embodiment of FIG. 8A, when the direction of the steering wheels 108 of the vehicle are substantially parallel to the longitudinal axis 340 of the vehicle 106, the proximity sensor 702 may be aligned with the target member 704. Responsively, the proximity sensor 702 generates an output signal that triggers a third light source 802a of the second light module 802 to emit light having a first color. In other words, the proximity sensor 702 triggers the second light module 802 to emit light having a first color when the steering wheels 108 of the vehicle 106 are straight.

On the contrary, as illustrated in the example embodiment of FIG. 6B, when an angle formed by the direction of the steering wheels 108 with the longitudinal axis of the vehicle 106 is greater than a threshold limit, the proximity sensor 702 does not align with the target member 704. Responsively, the proximity sensor 702 generates an output signal that triggers a fourth light source 802b of the second light module 802 to emit light having a second color. In other words, the proximity sensor 702 triggers the second light module 802 to emit light having a second color when the steering wheels 108 of the vehicle 108 are not straight.

Accordingly, based on the color of the light emitted from the second light module 802, the driver/operator of the vehicle 106 can determine whether the position or direction of the steering wheels 108 of the vehicle 106. Further, if both the first light module 604 and the second light module 802 emit light having a first color, i.e., if the steering wheels 108 are straight and if the tow bar is at an acceptable angle with respect to the surface 404 of the vehicle 106, the driver/operator of the vehicle can initiate a single point disconnect of the tow bar 102 and a subsequent departure.

Figure 9B:
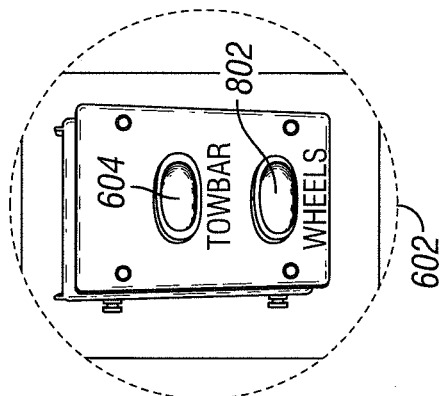
FIGS. 9A and 9B (collectively 'FIG. 9') illustrate an indicator panel associated with the first and second sensor system in accordance with an example embodiment.
Figure 9A:
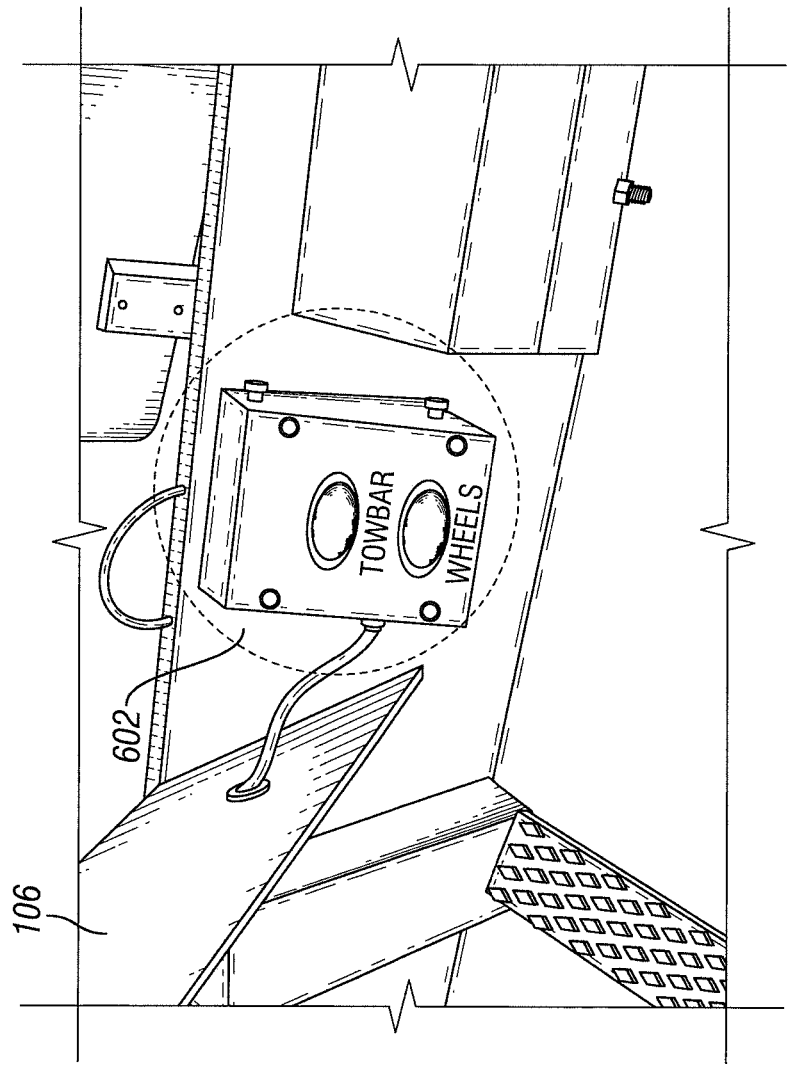

Turning to FIG. 9, this figure illustrates an indicator panel associated with the first and second sensor system in accordance with an example embodiment. In particular, FIGS. 9A and 9B illustrate the indicator panel 602 described above in association with FIGS. 6 and 8. As described above, the indicator panel 602 may include a first light module 604 and a second light module 802 that indicates an angle of the tow bar 102 with respect to the surface 404 of the vehicle 106 and a direction of the steering wheels 108 of the vehicle 106, respectively. Each of the first and second light modules may include two light sources. Further, the two light sources of the first light module may be covered by a first optic and the two light sources of the second light module may be covered by a second optic. Accordingly, the two light sources of each light module may not be directly visible to a user. Rather, the user may see the first optic of the first light module, the second optic of the second light module, and the light emitted by the light sources through the respective optics.

The first light module 604 may receive output signal from first sensor 502 and the second light module 802 may receive output signal from the second sensor 702. In other words, the first sensor output signal and the second sensor output signal may be received as input signals by the first light module 604 and the second light module 802, respectively. Further, based on the input signals received from the first and second sensor (502, 702), the first light module 604 and second light module 802 may each generate light having a first color or a second color to indicate the angle of the tow bar 102 respective to the surface of the vehicle 106 and the direction of the wheels of the vehicle 106, respectively.

As illustrated in FIG. 9A, the indicator panel 602 may be installed in a driver's compartment of the vehicle 106 such that the driver of the vehicle 106 can determine the angle of the tow bar 102 with respect to the surface 404 of the vehicle 106 and a direction of the steering wheels 108 of the vehicle 106 from the driver's cabin based on the light emitted from the first light module 604 and the second light module 802, respectively. For example, the first light module 604 may emit a green light when the angle of the tow bar 102 with respect to the surface 404 of the vehicle 106 is within a threshold limit, and may emit a red light when the angle of the tow bar 102 with respect to the surface 404 of the vehicle 106 exceeds a threshold limit. Similarly, the second light module 802 may emit a green light when the steering wheels 108 of the vehicle 106 are substantially straight and a red light when the steering wheels 108 of the vehicle 106 are not substantially straight. Accordingly, the driver of the vehicle 106 can determine that the tow bar 102 is aligned at an acceptable angle with respect to the surface 404 of the vehicle 106 and the steering wheels 108 of the vehicle 106 are substantially straight, when a green light is emitted from the first light module 604 and the second light module 802, respectively. Similarly, the driver of the vehicle 106 can determine that the tow bar 102 is not aligned at an acceptable angle with respect to the surface 404 of the vehicle 106 and the steering wheels 108 of the vehicle 106 are not substantially straight, when a red light is emitted from the first light module 604 and the second light module 802, respectively.

Even though FIG. 9A illustrates the indicator panel 602 being located in the driver's compartment, one of ordinary skill in the art can understand and appreciate that the indicator panel 602 can be positioned at any other appropriate location on the vehicle 106 without departing from a broader scope of this disclosure. Further, even though the example indicator panel 602 shown in FIGS. 9A and 9B includes two light modules (604, 802), one of ordinary skill in the art can understand and appreciate that the indicator panel 602 can have lesser or more number of light modules without departing from a broader scope of this disclosure.

Further, even though FIGS. 6, 8, and 9 illustrate an indicator panel 602 with a first and second light module (604,802), one of ordinary skill in the art can understand and appreciate that the visual indication mechanism can be replaced by auditory or tactile indication mechanisms, without departing from a broader scope of this disclosure. For example, the indicator panel may include an auditory mechanism that sends auditory alerts to the user to indicate the alignment of the tow bar to the surface of the vehicle and the direction of the steering wheels. Furthermore, one of ordinary skill in the art can understand and appreciate that in addition to or in place of the light modules, the indicator panel can include any other appropriate visual indication mechanisms, such as an alphanumeric display without departing from a broader scope of this disclosure. For example, the indicator panel can include a display mechanism that displays a scrolling or static text to indicate the alignment of the tow bar to the surface of the vehicle and the direction of the steering wheels.

In one example embodiment of the single point disconnect system, an aircraft 110 at a terminal gate of an airport may be coupled to one end of a tow bar 102 that includes a reflective member 506. In particular, the tow bar 102 may be connected to the nose landing gear 112 of the aircraft 110. Further, the other end of the tow bar 102 may be connected to the vehicle 106 equipped with the first sensor 502, the second sensor assembly (702, 704), and the indicator panel 602. The tow bar 102 may be long enough to place the vehicle 106 far enough to avoid hitting the aircraft 110, as well as to provide sufficient leverage to facilitate turns.

In said example embodiment, once the tow bar 102 is connected to both the aircraft 110 and the vehicle 106, the driver of the vehicle 106 may operate the vehicle to push the aircraft 110 back using the tow bar 102. While pushing the aircraft back, the driver may ignore the light emitted from the first light module 604 and the second light module 802. Once the aircraft 110 is pushed back to a desired location for taxiing, the driver of the vehicle 106 checks the light emitted from both the first light module 604 and the second light module 802 prior to initiating the single point disconnect of the tow bar 102 from the aircraft 110. If a green light is emitted from both the first light module 604 and the second light module 802, the driver knows that the angle of the tow bar 102 with respect to the surface 404 of the vehicle 106 and the steering wheel 108 direction are appropriate for a safe single point disconnect and subsequent departure. Accordingly, the driver may signal a ground crew to disconnect the tow bar 102 from the nose landing gear of the aircraft 110. Subsequently, the driver may drive the vehicle 106 along with the tow bar 102 away from the aircraft 110 without contact with the aircraft wheels 114.

However, if the light emitted from either one of the first light module 604 and the second light module 802 is a red light, the driver may make necessary adjustments or abort the single point disconnect operation. For example, if the red light is emitted from the first light module 604, the driver may continue to push the aircraft 110 back till the light from the light first light module 604 turns green. On the contrary, if the red light is emitted from the second light module 604, the driver may make necessary steering corrections till the light from the second light module 802 turns green. Once the light emitted from both the first and second light module (604,802) is green, the driver may signal a ground crew to initiate the single point disconnect subsequent to which the driver may drive the vehicle 106 away from the aircraft 110 along with the tow bar 102.

Yoke Style Tow Bar

Figure 10:
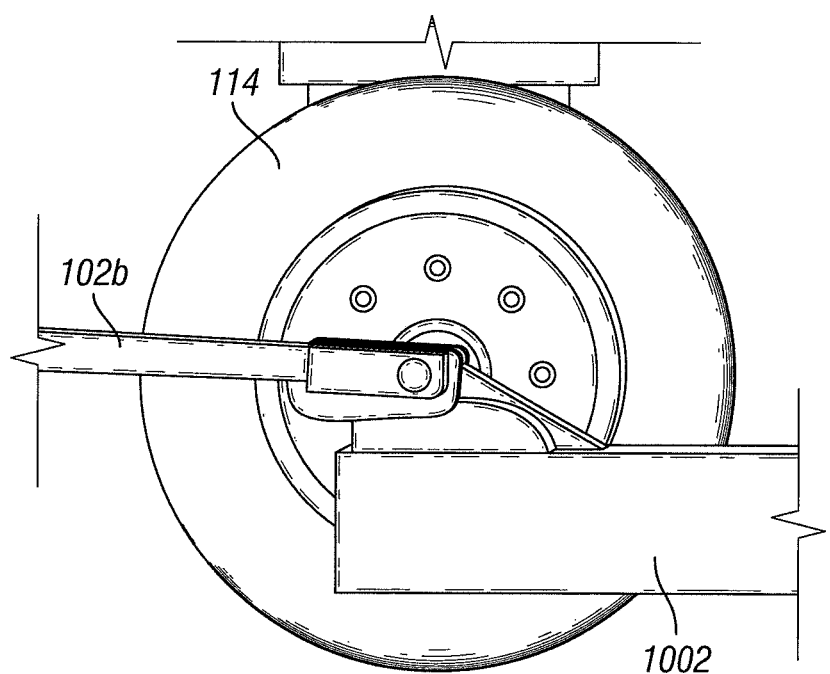
FIG. 10 illustrates a coupling of a conventional yoke head tow bar with an aircraft landing gear for an aircraft pushback operation.

In some aircrafts, for example MD-88, MD-90, and B717 aircrafts, typically, a yoke style tow bar 102b is used for the pushback operation. As illustrated in FIG. 10, the yoke style tow bar 102b may include a yoke style tow bar head 1004 (herein 'yoke head') that wraps around the front of the nose landing gear wheels 114 and attaches to the axle of the aircraft's nose landing gear 112. In particular, the yoke style tow bar head 1004 may have two extending arms that wrap around the front of the nose landing gear wheels 114 and the ends of each arm may be attached to the respective end of the aircraft's nose landing gear axle using tow pins. Further, as illustrated in FIG. 10, a nose wheel spray deflector 1002 may be attached to and horizontally project from the nose landing gear wheels 114 to prevent ingestion of side spray generated by the nose landing gear wheel into the wing mounted aircraft engines. In particular, the nose wheel spray deflector 1002 may wrap around the rear of the nose landing gear wheels 114 and surround three sides of the nose landing gear wheels 114.

As illustrated in FIG. 10, the nose wheel spray deflector 1002 may be positioned below the axle to which the yoke head 1004 is coupled. Accordingly, during a single point disconnect operation, when the yoke style tow bar 102 is disconnected from the axle of the nose landing gear 112, the yoke head 1004 of the tow bar 102b may drop down on the nose wheel spray deflector 1002 due to gravity and possibly cause damage to the nose wheel spray deflector 1002. Further, if both the arms are not disconnected from the respective ends of the aircraft's nose landing gear axle at the same time, that is, if the tow pins that attach the arms of the yoke head 1004 to the nose landing gear's axle are not disconnected at the same time, the yoke head 1004 may shift to one side or the other and drag across the nose landing gear wheels 114 and damage the nose landing gear wheels 114 when pulled away during disconnect departure.

Figure 11A:
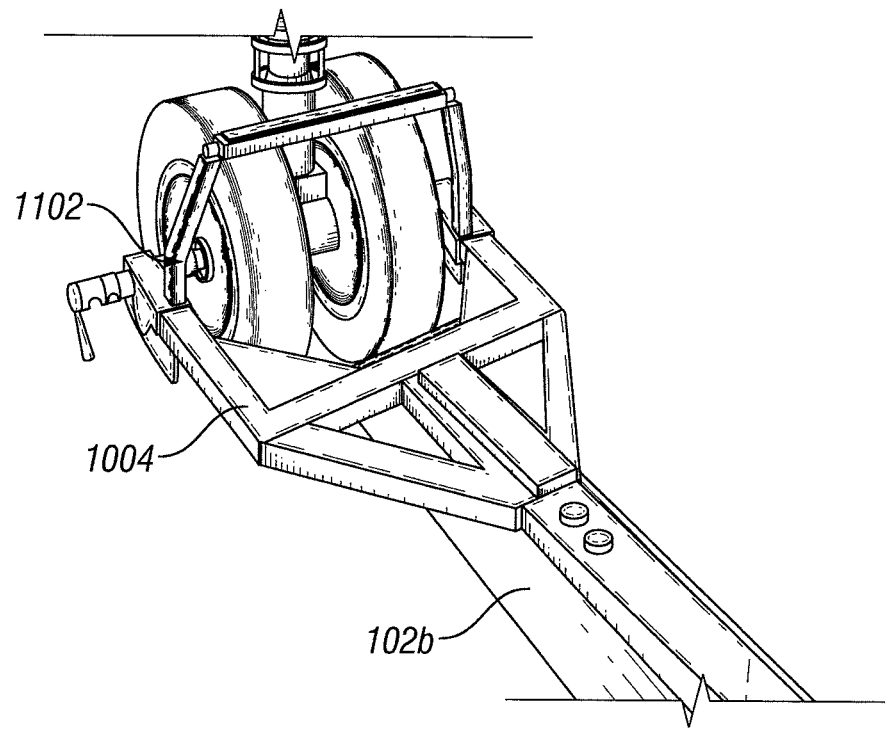
FIGS. 11A and 11B (collectively 'FIG. 11') illustrate a roller assembly attachment associated with the yoke head tow bar in accordance with an example embodiment.
Figure 11B:
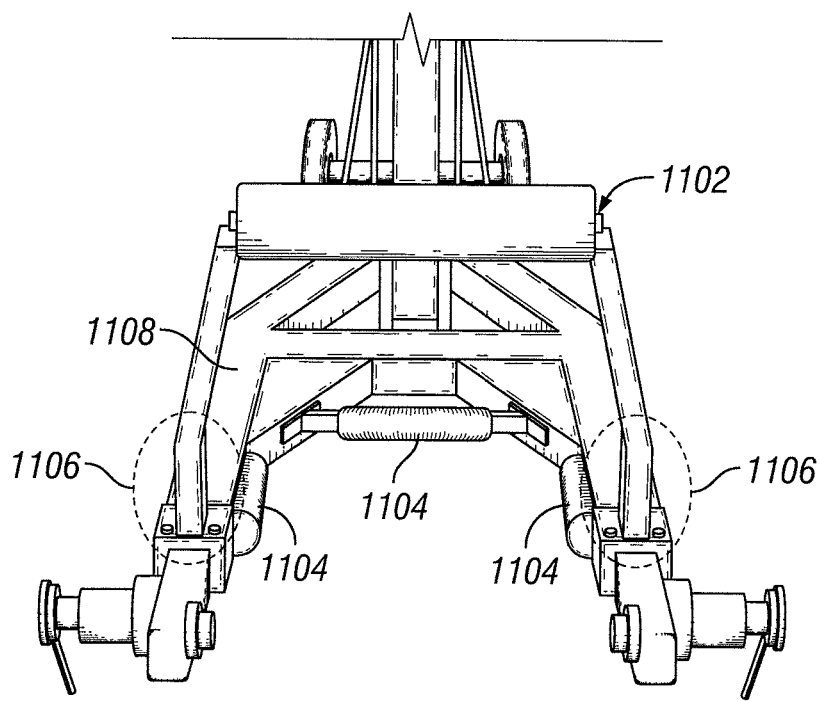

To prevent the above-mentioned damage to the nose landing gear wheels 114 and/or the nose landing gear 112 of the aircraft 110, an exemplary yoke style tow bar 102b is adapted to include a roller member 1102 (interchangeably referred to as "roller assembly"), and one or more rubber bumpers 1104, as illustrated in FIGS. 11A and 11B. In particular, the roller assembly 1102 may be attached to the extending arms of the yoke head 1004 at coupling locations 1106 and may span across the top of the nose landing gear wheels 114, as illustrated in FIG. 11B. Further, the one or more rubber bumpers 1104 may be attached to the insides of the yoke head 1004 as illustrated in FIG. 11B. In particular, a first rubber bumper 1104 may be attached to the inside of one of the extending arms of the yoke head 1004, a second rubber bumper 1104 may be attached to the inside of the other extending arm of the yoke style tow bar head 1004, and the third rubber bumper 1104 may be attached to the inside of a front portion 1108 of the yoke style tow bar head 1004 as illustrated in FIG. 11B.

As illustrated in FIG. 11A, when the yoke style tow bar 102b is connected to the nose landing gear 112 of the aircraft 110, the roller member 1102 hovers above or is positioned at a distance above the nose landing gear wheels 114 of the aircraft 110. Further, when the yoke style tow bar 102b is disconnected from the nose landing gear 112 of the aircraft 110, the roller member 1102 drops down on the nose landing gear wheels 114 of the aircraft 110, which holds the yoke style tow bar head 1004 away the nose wheel spray deflector 1002. Then, as the yoke style tow bar 102b is pulled away, the roller member 1102 rolls along a curve of the nose landing gear wheels 114 till the yoke style tow bar 102b is at a safe distance from the nose landing gear 112 for dropping without contact with the spray deflector 110. Further, the rubber bumpers 1104 cushion any contact with the nose landing gear wheels 114 of the aircraft 110 and prevents the yoke head 1004 from contacting the nose landing gear 112 of the aircraft.

One of ordinary skill in the art can understand and appreciate that the example roller member 1102 may be replaced by any other appropriate mechanism without departing from a broader scope of this disclosure. For example, the roller member 1102 may be replaced by two curved fender type structures that extend from the front of the yoke head 1004 and follow a curve of the nose landing gear tires, hovering at a distance above the tires when the tow bar 102b is connected to the aircraft 110. The fender structures may be made of spring steel or any other appropriate member. In another example, instead of a single roller member 1102 that spans across the nose landing gear wheels 114, the yoke head 1004 may be attached with a pair of roller members that would extend from the yoke style tow bar head 1104 and hover above the nose landing gear wheels 114 when the tow bar 102b is connected to the aircraft. In said example that uses a pair of roller members, the two roller members may face each other and may have a gap in between them which allows clearance for the nose landing gear strut. Further, one of ordinary skill in the art can understand and appreciate that the bumpers 1104 may be made of rubber or any other appropriate material.

In addition, one of ordinary skill in the art can understand and appreciate that the roller member 1102 and the one or more rubber bumpers 1104 are example protection gears for protecting the nose landing gear 112 and nose landing gear wheels 114 of the aircraft 110, and are not limiting. In other words, any other appropriate protective mechanism can be used in conjunction with the yoke style tow bar 102b to prevent damage to the nose landing gear 112 and/or nose landing gear wheels 114 of the aircraft 110. In one example, extending skid/skegs with rollers may be attached to each extending arm of the yoke style tow bar head 1004. The extending skid/skeg with rollers may hold the yoke style tow bar head 1004 up high enough to keep it off the spray deflector 1004. In another example, a skid/skeg may be attached to the yoke style tow bar body behind the yoke style tow bar head 1004. In some embodiments, the skid/skeg may be foldable towards the body of the yoke style tow bar 102b.

Further, the single point disconnect system as disclosed herein may be embodied in many different forms and should not be construed as limited to the embodiments set forth herein; rather, these embodiments are provided so that this disclosure will be thorough and complete, and will fully convey the scope of the disclosure to those having ordinary skill in the art. Furthermore, all "examples" or "exemplary embodiments" given herein are intended to be non-limiting and among others supported by representations of the present disclosure.

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for operation with a combination of a vehicle and a tow bar assembly that is attachable to the vehicle to pushback an aircraft, the system comprising:
    a first sensor assembly configured to determine an angle of the tow bar respective to a surface of the vehicle to which the tow bar is coupled;
    a second sensor assembly configured to determine a direction of wheels of the vehicle that are responsible for steering the vehicle; and
    an indicator panel disposed in the vehicle and operable to receive input from the first sensor assembly and the second sensor assembly to indicate the angle of the tow bar respective to the surface of the vehicle and the direction of the wheels of the vehicle.

2. The system of claim 1, wherein the wheels of the vehicle that are responsible for steering the vehicle include front wheels positioned proximate to a front end of the vehicle.

3. The system of claim 1, wherein the indicator panel comprises a first light module coupled to the first sensor assembly and a second light module coupled to the second sensor assembly.

4. The system of claim 3, wherein the angle of the tow bar respective to the surface of the vehicle is indicated by a light emitted from the first light module and the direction of the wheels of the vehicle that are responsible for steering is indicated by a light emitted by the second light module.

5. The system of claim 3, wherein the first sensor assembly triggers the first light module to emit light having a first color when the angle of the tow bar respective to the surface of the vehicle to which the tow bar is coupled is within a threshold limit.

6. The system of claim 5, wherein the first sensor assembly triggers the first light module to emit light having a second color when the angle of the tow bar respective to the surface of the vehicle to which the tow bar is coupled exceeds a threshold limit.

7. The system of claim 3, wherein the second sensor assembly triggers the second light module to emit light having a first color when the direction of the wheels of the vehicle that are responsible for steering the vehicle are substantially parallel to a longitudinal axis of the vehicle.

8. The system of claim 7, wherein the second sensor assembly triggers the second light module to emit light having a second color when an angle formed between the direction of the wheels of the vehicle that are responsible for steering the vehicle and a longitudinal axis of the vehicle is greater than a threshold limit.

9. The system of claim 3:
    wherein the first light module comprises a first light source adapted to emit light having a first color and a second light source adapted to emit light having a second color, and
    wherein the second light module comprises a third light source configured to emit light having the first color and a fourth light source configured to emit light having the second color.

10. The system of claim 1, wherein the first sensor assembly comprises:
    a first sensor that is configured to couple to the surface of the vehicle to which the tow bar is coupled, and
    a reflective member that is configured to couple to the tow bar.

11. The system of claim 10, wherein the first sensor is a photoelectric sensor.

12. The system of claim 1, wherein the second sensor assembly comprises:
    a second sensor that is configured to couple to the vehicle and positioned near a tie rod of the vehicle that is underneath the vehicle, and
    a target member that is configured to couple to the tie rod of the vehicle.

13. The system of claim 12, wherein the second sensor is a proximity sensor.

14. The system of claim 1, further comprising a roller member configured to couple to a tow bar head of the tow bar when the tow bar is a yoke style tow bar.

15. The system of claim 14, wherein the roller member is configured to keep the yoke style tow bar from contacting a spray deflector coupled to a nose landing wheel when the yoke style tow bar is disconnected from a nose landing gear of the aircraft.

16. The system of claim 15:
    wherein when the yoke style tow bar is coupled to the nose landing gear of the aircraft, the roller member is configured to be positioned at a distance above the nose landing wheel of the aircraft, and
    wherein when the yoke style tow bar is disconnected from the nose landing gear of the aircraft, the roller member is configured to drop down on the nose landing wheel of the aircraft and roll along a curve of the nose landing wheel until the tow bar is at a safe distance from the nose landing gear and a spray deflector coupled to the nose landing wheel.

17. A system for operation in a combination of a vehicle and a yoke style tow bar assembly attachable to the vehicle to pushback an aircraft, the system comprising:
    a first sensor assembly configured to determine an angle of the tow bar respective to a surface of the vehicle to which the tow bar is coupled;
    a second sensor assembly configured to determine a direction of wheels of the vehicle that are responsible for steering the vehicle;
    an indicator panel disposed in the vehicle and operable to receive input from the first sensor assembly and the second sensor assembly to indicate the angle of the tow bar respective to the surface of the vehicle and the direction of the wheels of the vehicle; and
    a roller member configured to couple to a tow bar head of the yoke style tow bar to protect at least one of a nose landing gear and a spray deflector of the aircraft from contact with the tow bar head of the yoke style tow bar.

18. The system of claim 17, further comprising one or more bumper members configured to couple to the tow bar head of the yoke style tow bar to cushion a contact with the nose landing gear wheels of the aircraft.

19. The system of claim 18, wherein the one or more bumper members are made of rubber material.

20. The system of claim 17,
wherein when the yoke style tow bar is coupled to the nose landing gear of the aircraft, the roller member is configured to be positioned at a distance above nose landing gear wheels of the aircraft, and
wherein when the yoke style tow bar is disconnected from the nose landing gear of the aircraft, the roller member is configured to drop down on the nose landing gear wheels of the aircraft and roll along a curve of the nose landing wheels until the tow bar is at a safe distance from the nose landing gear and a spray deflector coupled to the nose landing wheels.

21. The system of claim 17, wherein the indicator panel comprises a first light module coupled to the first sensor assembly and a second light module coupled to the second sensor assembly.

22. The system of claim 21, wherein the angle of the tow bar respective to the surface of the vehicle is indicated by a light emitted from the first light module and the direction of the wheels of the vehicle is indicated by a light emitted by the second light module.

23. The system of claim 21, wherein the first sensor assembly triggers the first light module to emit light having a first color when the angle of the tow bar respective to the surface of the vehicle to which the tow bar is coupled is within a threshold limit.

24. The system of claim 23, wherein the first sensor assembly triggers the first light module to emit light having a second color when the angle of the tow bar respective to the surface of the vehicle to which the tow bar is coupled exceeds a threshold limit.

25. The system of claim 21, wherein the second sensor assembly triggers the second light module to emit light having a first color when the direction of the wheels of the vehicle that are responsible for steering the vehicle are substantially parallel to a longitudinal axis of the vehicle.

26. The system of claim 25, wherein the second sensor assembly triggers the second light module to emit light having a second color when an angle formed between the direction of the wheels of the vehicle that are responsible for steering the vehicle and a longitudinal axis of the vehicle is greater than a threshold limit.

27. A method associated with a single point disconnect system comprising a vehicle and a tow bar where a first end of the tow bar is coupled to a nose landing gear of an aircraft and a second end of the tow bar that is opposite to the first end is coupled to the vehicle, the method comprising:
generating, by a first sensor assembly of the single point disconnect system, an output signal based on a determination of an angle of the tow bar respective to a surface of the vehicle;
generating, by a second sensor assembly, another output signal based on a determination of a direction of wheels of the vehicle that are responsible for steering the vehicle;
receiving, by a first light module and a second light module of an indicator panel, the output from the first sensor assembly and the other output from the second sensor assembly as input signals to the indicator panel; and
based on the input signals,
emitting, by the first light module of the indicator panel, light representative of the angle of the tow bar respective to a surface of the vehicle, and
emitting, by the second light module of the indicator panel, light representative of the direction of the wheels,
wherein the first sensor assembly and the second sensor assembly are coupled to the first light module and the second light module of the indicator panel, respectively.

28. The method of claim 27,
wherein the first light module comprises a first light source adapted to emit light having a first color and a second light source adapted to emit light having a second color, and
wherein the second light module comprises a third light source configured to emit the light having the first color and a fourth light source configured to emit the light having the second color.

29. The method of claim 28, further comprising:
emitting, by the first light source of the first light module, the light having a first color when the angle of the tow bar respective to the surface of the vehicle to which the tow bar is coupled is within a threshold limit;
emitting, by the second light source of the first light module, the light having the second color when the angle of the tow bar respective to the surface of the vehicle to which the tow bar is coupled exceeds a threshold limit;
emitting, by the third light source of the second light module, the light having the first color when the direction of the wheels of the vehicle that are associated with steering the vehicle are substantially parallel to a longitudinal axis of the vehicle; and
emitting, by the fourth light source of the second light module, the light having the second color when an angle formed between the direction of the wheels of the vehicle that are associated with steering the vehicle and a longitudinal axis of the vehicle is greater than a threshold limit.

30. The method of claim 27,
wherein the first sensor assembly comprises:
a first sensor that is configured to couple to the vehicle on the surface of the vehicle to which the tow bar is coupled, and
a reflective member that is configured to couple to the second end of the tow bar, and
wherein the second sensor assembly comprises:
a second sensor that is configured to couple to the vehicle underneath the vehicle near a tie rod of the vehicle, and
a target member that is configured to couple to the tie rod of the vehicle.

31. A system comprising:
a vehicle that is configured to pushback an aircraft using an attachable tow bar;
a first sensor assembly configured to determine an angle of the tow bar respective to a surface of the vehicle to which the tow bar is attached;
a second sensor assembly configured to determine a direction of wheels of the vehicle that are responsible for steering the vehicle; and
an indicator panel that is disposed in the vehicle and operable to receive input from the first sensor assembly and the second sensor assembly to indicate the angle of the tow bar respective to the surface of the vehicle and the direction of the wheels of the vehicle.

* * * * *